United States Patent Office 3,663,656
Patented May 16, 1972

3,663,656
PROCESS FOR MAKING NOVEL GRAFT COPOLYMER BLENDS
Emory A. Ford, Hampden, and Speros P. Nemphos, Springfield, Mass., assignors to Monsanto Company, St. Louis, Mo.
No Drawing. Filed June 22, 1970, Ser. No. 48,563
Int. Cl. C08f 41/12, 37/18
U.S. Cl. 260—876 R
13 Claims

ABSTRACT OF THE DISCLOSURE

A latex of a rubbery polymer having a particle size of less than 0.25 micron and a polymerizable vinylidene monomer formulation is subjected to polymerization conditions to produce polymerization and grafting of at least a portion of the monomer formulation onto the rubbery polymer. Subsequently, a latex of agglomerated rubbery polymer having a particle size of 0.35–1.2 microns is added to the polymerizing latex and polymerization of the vinylidene monomer formulation is continued to produce grafting of at least a portion thereof onto the agglomerated rubbery polymer.

BACKGROUND OF THE INVENTION

As is well known, graft polyblends of rubbers with various vinylidene polymers have advantages in providing compositions of desirable toughness, chemical resistance and good formability. ABS polyblends have proven particularly advantageous in many applications, and modifications of such ABS polyblends include the substitution of alkyl acrylate esters for a portion of the vinylidene monomer components, variations of the ratio of styrene-type and acrylonitrile-type monomers and the use of saturated rubbers such as acrylate rubbers as the substrate for the graft.

In United States Pat. No. 3,509,238 granted Apr. 28, 1970 to Aubrey and Jastrzebski, there is disclosed and claimed an ABS-type polyblend containing graft copolymers having distinct degrees of grafting to provide a highly desirable balance of properties, the lowly grafted polymer apparently tending to cluster and simulate a larger particle size graft copolymer to provide a very high degree of impact resistance. In United States Pat. No. 3,509,237 granted to Norman E. Aubrey on Apr. 28, 1970, there is disclosed and claimed an ABS-type polyblend wherein there are graft copolymer particles of relatively small size and graft copolymer particles of relatively large size. A relatively small amount of the large particles apparently provides greatly enhanced impact resistance and the larger amount of the smaller particles extends the effectiveness of the large particles to levels which larger amounts of either do not provide. Additionally, the volume of small particles masks the undesirable effects of the large particles upon the overall balance of properties.

The concepts of the aforementioned applications have been widely employed in commercial compositions. In the use of the concept of the latter of the above mentioned applications, the large particle component has been provided by a mass/suspension polymerization process and the smaller particle component has been provided by an emulsion polymerization process. There has been a desire to prepare both components in a single reactor by the same polymerization process in an effort to minimize cost. In such efforts utilizing an emulsion process, there has been encountered considerable difficulty because of the tendency of agglomerated latices to be unstable during the grafting reaction and also because of the desirability of controlling the amount of grafting upon the two rubber components of different particle size.

It is an object of the present invention to provide a novel emulsion polymerization process for the manufacture of improved polyblends wherein a single reactor and a single cycle may be used to provide a polyblend having a bimodal particle size distribution size with the particles of the two sizes being grafted to an optimum level.

It is also an object to provide such a process which is relatively simple and economical in operation and which is adapted to facile variation to accommodate variations in particle size and grafting level.

Still another object is to provide such a process which may be used on a continuous or semicontinuous basis and which lends itself to automation so that multicomponent polyblends may be readily prepared with minimal labor investment.

A further object is to provide novel polyblends manufactured by a single emulsion process and having a bimodal particle size distribution with different degrees of grafting for the two particle size components.

SUMMARY OF THE INVENTION

It has now been found that the foregoing and related objects and advantages may be readily attained in a process for making a polyblend comprising forming a latex of a polymerizable vinylidene monomer formulation and a graftable rubbery polymer having an average particle size of less than 0.25 micron (weight average) and a diene monomer component, and this latex is subjected to polymerization conditions to produce grafting onto the graftable rubbery polymer of at least a portion of the vinylidene monomer being formed. Subsequent to commencement of polymerization and grafting of the vinylidene monomer formulation, an agglomerated rubbery polymer having a particle size of 0.35–1.2 microns (weight average) is added, the agglomerated rubbery polymer comprising 10–100 percent by weight of the small particle rubbery polymer. Thereafter polymerization of the vinylidene monomer formulation is continued to produce grafting upon the agglomerated rubbery polymer of at least a portion of the vinylidene polymer being formed. There is then recovered a polyblend containing both sizes of rubbery polymer particles grafted with the vinylidene polymer.

In accordance with the preferred embodiment of the present invention, the polymerizable monomer formulation is comprised at least principally of a monovinylidene aromatic hydrocarbon and an ethylenically unsaturated nitrile. Preferably the monovinylidene aromatic hydrocarbon is stryene and the nitrile monomer is acrylonitrile. The preferred embodiment of the present invention utilizes as the rubbery polymers those which contain at least 75.0 percent by weight of a conjugated 1,3-diene.

The vinylidene monomer formulation is added over at least half the polymerization cycle with 25–80 percent thereof being added prior to the addition of the large particle rubbery polymer. Most desirably the large particle rubbery polymer is added to the reaction mixture after one-half of the total monomer formulation has been added.

The agglomerated rubbery polymer preferably has a particle size of 0.4–1.0 micron and the small particle rubbery polymer has a particle size of about 0.05–0.20 micron. Desirably, the amount of the agglomerated rubbery polymer added is equal to about 20–60 percent by weight of the small particle rubbery copolymer. The total amount of rubbery polymers in the polyblend comprises about 2–50 percent by weight thereof.

The conditions of polymerization produce grafting of the polymer being formed onto both of the rubbery polymers. Generally, the small particle graft copolymer has a superstrate to substrate ratio of about 45–100:100 and the agglomerated graft copolymer has a superstrate to substrate ratio of about 15–40:100.

The theory of operation is not fully understood but it is clearly known that the procedure of the present invention permits grafting of agglomerated rubber latices which have proven unstable when attempted to be grafted alone in the conventional manner. It is possible that the presence of a large volume of stable and partially grafted small particle graft copolymer at the time of the addition of the agglomerated rubber latex may tend to provide colloidal stability. Moreover, the agglomerated rubber particles are now dispersed in a larger volume of water so that coagulation is less likely to occur. Another aspect of the procedure of the present invention is that it would appear to ensure or facilitate the proper amount of grafting for the larger particle as contrasted with the higher degree of grafting desired for the smaller particle.

DETAILED DESCRIPTION OF THE EMBODIMENTS OF THE INVENTION

As has been pointed out previously, the process of the present invention requires graftable rubbery polymer substrates and vinylidene monomer formulations. In addition, latex stabilizers are required and various other components are utilized to obtain the desired results. These various components will be discussed hereinafter in detail.

The rubber substrate

Various rubbers onto which the vinylidene may be grafted during the polymerization in the presence thereof are utilizable as the substrate of the graft copolymers including conjugated 1,3-diene rubbers, ethylene-propylene-diene terpolymer rubbers, acrylate-diene interpolymer rubbers, and mixtures thereof. Although saturated rubbers may be grafted, it has been found desirable to include at least a small amount (at least 1.0 percent by weight) of a diene monomer component such as butadiene-1,3 in order to facilitate grafting thereof. This diene monomer component will normally comprise 1 to 20 percent by weight and preferably 2 to 8 percent by weight of the ethylene/propylene/diene terpolymer or acrylate copolymer rubber.

The preferred rubbers are diene rubbers or mixtures of diene rubbers, i.e., any rubbery polymers (a polymer having a second order transition temperature not higher than −20° centigrade, as determined by ASTM Test D–746–52T) of one or more conjugated 1,3-dienes, e.g., butadiene, isoprene, piperylene, chloroprene, etc. Such rubbers include homopolymers of conjugated 1,3-dienes and inter-polymers of such 1,3-dienes with up to an equal amount by weight of one or more copolymerizable monoethylenically unsaturated monomers, such as monovinylidene aromatic hydrocarbons (e.g., styrene; an aralkyl-styrene, such as the o-, m-, and p-methylstyrenes, 2,4-dimethylstyrene, the ar-ethylstyrenes, p-tert-butylstyrene, etc.; and alpha-alkylstyrene, such as alpha-methylstyrene, alpha-ethylstyrene, alpha-methyl-n-methylstyrene, etc.; vinyl naphthalene, etc.); ar-halo monovinylidene aromatic hydrocarbons (e.g., the o-, m-, and p-chlorostyrenes, 2,4-dibromostyrene, 2-methyl-4-chlorostyrene, etc.); acrylonitrile; methacrylonitrile; alkyl acrylates (e.g., methyl acrylate, butyl acrylate, 2-ethylhexyl acrylate, etc.), the corresponding alkyl methacrylates; acrylamides (e.g., acrylamide, methacrylamide, N-butyl acrylamide, etc.); unsaturated ketones (e.g., vinyl methyl ketone, methyl isopropenyl ketone, etc.); alpha-olefins (e.g., ethylene, propylene, etc.); pyridines; vinyl esters (e.g., vinyl acetate, vinyl stearate, etc.); vinyl and vinylidene halides (e.g., the vinyl and vinylidene chlorides and bromides, etc.); and the like.

Although the rubber may contain up to about 2 percent of a cross-linking agent, based on the weight of the rubber-forming monomer or monomers, excessive cross-linking can result in loss of the rubbery characteristics. However, cross-linking of the rubber graft is desirable to preserve proper morphology of the particles thus produced. Accordingly, some cross-linking during the grafting reaction is advantageous and inherent cross-linking can be further encouraged through the variation of graft polymerization conditions as is well known in the art. Thus, rubber graft particles of spherical form and proper size may be obtained and maintained even during mechanical processing to achieve the desired dispersion thereof in the rigid matrix when such a technique is employed. The cross-linking agent can be any of the agents conventionally employed for cross-linking diene rubbers, e.g., divinylbenzene, diallyl maleate, diallyl fumarate, diallyl adipate, allyl acrylate, allylmethacrylate, diacrylates and dimethacrylates of polyhydric alcohols, e.g., ethylene glycol dimethacrylate, etc.

A preferred group of rubbers are those consisting essentially of 75 to 100 percent by weight of butadiene and/or isoprene and up to 25 percent by weight of a monomer selected from the group consisting of mono-vinylidenearomatic hydrocarbons (e.g., styrene) and unsaturated nitriles (e.g., acrylonitrile), or mixtures thereof. Particularly advantageous substrates are butadiene homopolymer or an interpolymer of 90 to 95 percent by weight butadiene and 5 to 10 percent by weight of acrylonitrile or styrene.

POLYMERIZABLE VINYLIDENE MONOMER FORMULATIONS

The polymerizable monomer formulation will, of course, contain the monomers to be polymerized, initiator where required, and other desirable components such as stabilizers, molecular weight regulators, etc.

The specific monomers will, of course, vary with the desired product. However, the process is highly advantageously employed in the manufacture of styrene-type polyblends, i.e., polymerizable monomer formulations containing monovinylidene aromatic hydrocarbons either alone or in combination with other copolymerizable monomers such as unsaturated nitriles. Where a styrene-type monomer is employed solely, then the resultant product will be of the type known as an "impact styrene." Where styrene and acrylonitrile-type monomers are employed jointly in the polymerizable formulation, the resulting product will be of the type known as "ABS." However, it should be understood that the composition of the polymerizable formulation may vary widely.

Exemplary of the monovinylidene aromatic monomers that may be homopolymerized or interpolymerized are styrene; alpha-alkyl monovinylidene monoaromatic compounds, e.g., alpha-methylstyrene, alpha-ethylstyrene, alpha-methylvinyltoluene, alpha-methyl dialkylstyrene, etc.; ring-substituted alkyl styrene, e.g., vinyl toluene, o-ethylstyrene, p-ethylstyrene, 2,4-dimethylstyrene, etc.; ring-substituted halostyrenes, e.g., o-chlorostyrene, p-chlorostyrene, o-bromostyrene, 2,4-dichlorostyrene, etc.; ring-alkyl, ring-halo-substituted styrenes, e.g., 2-chloro-4-methylstyrene, 2,6-dichloro-4-methylstyrene, etc.; vinyl naphthalene; vinyl anthracene, etc. The alkyl substituents generally have one to four carbon atoms and may include isopropyl and isobutyl groups. If so desired, mixtures of such monovinylidene aromatic monomers may be employed.

Exemplary or other vinylidene monomers that may be employed solely or interpolymerized with monovinylidene aromatic monomers are ethylenically unsaturated nitriles, such as acrylonitrile, methacrylonitrile, ethacrylonitrile and mixtures thereof; conjugated 1,3-dienes, e.g., butadiene, isoprene, etc.; alpha- or beta-unsaturated monobasic acids and derivatives thereof, e.g., acrylic acid, methyl acrylate, ethyl acrylate, butyl acrylate, 2-ethylhexyl acrylate, methacrylic acid and the corresponding esters thereof; acrylamide, methacrylamide; vinyl esters such as vinyl acetate, vinyl propionate, etc.; dialkyl maleates or fumarates such as dimethyl maleate, diethyl maleate, dibutyl maleate, the corresponding fumarates, etc. As is known in the art, the amount of various of the foregoing materials useful as comonomers in an interpolymer will vary.

The preferred vinylidene monomer formulations of the present invention consist at least principally of a monovinylidene aromatic hydrocarbon and an ethylenically unsaturated nitrile, i.e., such monomers comprise at least 50.0 percent by weight and preferably at least 75.0 percent by weight of the formulation. Most desirably, such monomers comprise at least 90.0 percent by weight of the formulation and the usual commercial compositions are substantially completely comprised of such monomers although minor amounts, i.e., less than 5.0 percent by weight of other components such as chain transfer agents, modifiers, etc., may be included.

These preferred polymerizable monomer mixtures contain at least 10 percent by weight of the monovinylidene aromatic hydrocarbon monomer and preferably at least 50 percent by weight thereof. They also contain at least 5 percent by weight of the unsaturated nitrile and preferably at least 10 percent by weight thereof. From the standpoint of highly advantageous commercial practice, to produce advantageous ABS products, the monomer formulations contain 20 to 95 percent, and preferably 60 to 85 percent, by weight of the monovinylidene aromatic hydrocarbon and 80 to 5 percent, and preferably 40 to 15 percent, by weight of the unsaturated nitrile.

Agglomeration of the rubber latex

As has been indicated, a latex having a particle size of less than 0.25 micron is agglomerated to provide a particle size of 0.35–1.2 microns (weight average). Various techniques have been proposed and utilized for the agglomeration of rubber latices including freeze-thaw, acidulation, and shear or pressure agglomeration (the last technique being the subject of British Pats. Nos. 976,212, 976,213, and 976,214).

The preferred process of agglomeration utilizes a highly advantageous acidulation technique which is the subject of copending United States application Ser. No. 677,078 filed Oct. 23, 1967 by William O. Dalton, now United States Pat. 3,558,541, granted Jan. 26, 1971. In this process, an organic acid anhydride is added to a rubber latex and dispersed therein before substantial hydrolysis of the anhydride occurs. The latex uses as the emulsifier a soap or salt of an organic acid having an ionization constant lower than that of the acid of the anhydride. The mixture is then allowed to stand with minimal agitation until the anhydride hydrolyzes to provide free acid which attacks the emulsifying agent and causes agglomeration of the rubbery particles. Substantial agitation during this portion of the process is avoided to prevent coagulation. After the desired particle size has been obtained, the latex is stabilized by the addition of an acid-stable emulsifying agent or by the regeneration of the fatty acid soap through the addition of an alkali.

The acid anhydride preferably employed is acetic acid anhydride although maleic acid anhydride and propionic acid anhydride have also been employed advantageously. Generally, the amount of anhydride employed will be at least one-tenth the stoichiometric equivalent of the emulsifying agent (a molar ratio of 1:20 since there are two acid radicals). Normally, the amount employed is at least one-fourth the stoichiometric equivalent and preferably the amount added is in excess of the stoichiometric amount of the emulsifying agent. However, amounts in excess of five times the equivalent provide no additional benefit and may interfere with the stability of the agglomerated latex or with the properties of the polymer by introducing excessive acidity or corrosive action.

The time for agglomeration will vary with temperature, the amount of anhydride and emulsifying agent, the rate of hydrolysis of the anhydride, the nature of the rubbery polymer, the initial and desired sizes of the particles, etc. Periods of five minutes to ten hours may be employed, with normal times of about five minutes to two hours being employed at ambient temperatures.

After the agglomeration reaction has taken place, the latex is stabilized by the addition of an acid stable emulsifier or by the regeneration of the initial soap emulsifier by the addition of a basic compound to neutralize the acid. Anionic emulsifying agents such as alkali metal salts of long chain sulfonic acids and non-ionic emulsifying agents such as ethoxylated octyl phenol have been employed successfully. An alkali metal hydroxide or other basic compound such as a carbonate may be added to regenerate the fatty acid soap; the amount added will normally be the stoichiometric equivalent of the acid anhydride although lesser amounts may be employed with some lessening in stability of the latex.

Further information considering this highly advantageous agglomeration process may be found in the aforementioned application of William O. Dalton. In addition, the agglomerating effect of the acid anhydride may be potentiated by the prior addition to the latex of an inorganic electrolyte such as an alkali metal halide. This procedure is described in the copending application of William O. Dalton, Ser. No. 694,870 filed Jan. 2, 1968.

Graft polymerization process

The graft copolymer is prepared by polymerizing the monomer formulation in the presence of the preformed rubber substrate, generally in accordance with conventional graft polymerization techniques. In such graft polymerization, the preformed rubbery polymer substrate generally is dispersed with the monomer in the latex and this admixture is polymerized to combine chemically or graft at least a portion of the polymer upon the rubber substrate. Depending upon the ratio of monomers to rubbery substrate and polymerization conditions, it is possible to produce both the desired degree of grafting of the polymer onto the rubbery substrate and the polymerization of ungrafted polymer to provide the desired amount of matrix polymer at the same time. Normally, the ratio of monomers to rubber charged to the graft polymerization reaction is the primary determinant of the superstrate:substrate ratio of the resultant graft copolymer. However, conditions of polymerization, rubber chemistry and particle size, rates of monomer addition, chain transfer agents, etc., also exert an effect.

The initiator or catalyst is generally included within the range of 0.001 to 1.0 percent by weight, and preferably on the order of 0.005 to 0.5 percent by weight of the polymerizable monomer, depending upon the monomers and the desired polymerization cycle. The initiator may be added incrementally to facilitate optimum grafting. As is well known, it is often desirable to incorporate molecular weight regulators such as mercaptans, halides and terpenes in relatively small percentages by weight, on the order of 0.001 to 2.5 percent by weight of the polymerizable monomer. In addition, it may be desirable to include relatively small amounts of antioxidants or stabilizers such as the conventional alkylated phenols, although these may be added during or after polymerization.

In the present polymerization process, monomer formulation and small particle rubbery substrate latex are emulsified in water by use of suitable emulsifying agents such as fatty acid soaps, alkali metal or ammonium soaps of high molecular weight alkyl or alkaryl sulfates or sulfonates, mineral acid salts of long chain aliphatic amines, etc. Emulsifying agents which have proven particularly advantageous are sodium oleate, sodium palmitate, sodium stearate and other sodium soaps. Generally, the emulsifying agent is provided in amounts of about 0.1 to 15 parts by weight per 100 parts by weight of the monomer formulation and water is provided in an amount of about 1 to 4 parts per part of monomer formulation, and even in larger ratios where greater dilution is desirable.

If so desired, the aqueous latex formed in the emulsion polymerization of the rubbery substrate may provide the aqueous medium into which the monomer formulation is incorporated with or without additional emulsifying agents, water, etc. However, the small particle rubbery polymer may be dissolved in the monomer formulation and the mixture emulsified, or a latex thereof may be separately prepared.

Various water-soluble free radical polymerization initiators are conventionally used for emulsion polymerization of the rubber monomers including conventional peroxy and azo catalysts, and the resultant latex containing residual initiator may be used as the aqueous medium with which the polymerizable monomers are mixed. Usually additional initiator will be added for graft polymerization. Exemplary of peroxy catalysts are the alkali metal peroxides, persulfates, perborates, peracetates and percarbonates, and hydrogen peroxide. If so desired, the initiator may be activated to form a redox system. In addition, it may be advantageous to include an oil-soluble initiator such as di-tert-butyl peroxide, benzoyl peroxide, lauroyl peroxide, oleyl peroxide, toluyl peroxide, di-tert-butyl diperphthalate, tert-butyl peracetate, tert-butyl perbenzoate, dicumyl peroxide, tert-butyl peroxide, isopropyl peroxy dicarbonate, 2,5 - dimethyl - 2,5 - di-(tert-butyl-peroxy)-hexane, 2,5 - dimethyl-2,5-di(tert-butylperoxy)-hexane-3, tert-butyl hydroperoxide, cumene hydroperoxide, p-methane hydroperoxide, cyclopentane hydroperoxide, diisopropylbenzene hydroperoxide, p-tert-butyl-cumene hydroperoxide, pinane hydroperoxide, 2,5-dimethyl-hexane-2,5-dihydroperoxide, etc., and mixtures thereof. However, other free-radical generating catalysts may be employed such as actinic radiation.

The latex of the rubbery polymer and the monomer formulation is polymerized in an inert atmosphere at temperatures in the range of 20–100° centigrade with agitation. Pressures of 1–100 lbs. per square inch may be employed. Although the entire amount of the monomer formulation may be present at the time that polymerization is commenced, generally it is preferable to add the monomer formulation either continuously or in increments over the major portion of the polymerization cycle with at least some of the monomer formulation being added after the agglomerated or large particle rubber latex has been introduced into the polymerizing mixture. Normally, additional initiator is added incrementally or continuously over that portion of the cycle during which the monomer formulation is being added. Polymerization is continued until substantially all, i.e., more than 90 percent, of the monomers have been polymerized. The remaining monomer formulation or other volatile components are then distilled from the latex which is dewatered, washed and dried. The latex may be dewatered by spray drying, by coagulation through the addition of salts, etc.

The total amount of monomer formulation to be added will normally amount to 70–250 parts monomer per 100 parts total rubbery polymer and preferably about 100–200 parts per 100 parts total rubbery polymer. The actual amount of monomer formulation added will vary dependent upon the grafting efficiency of the reaction and the desired superstrate to substrate ratio for the graft copolymers formed by the two different particle size rubbers.

The polymerization cycle will normally range from 2–10 hours and preferably 4–6 hours. In accordance with the preferred procedure, the monomer formulation is added over approximately ⅖–⅚ of the total polymerization cycle. Although this addition may take the form of increments of varying size, the preferred technique utilizes substantially continuous addition at a relatively constant rate over ½–¾ of the cycle.

The agglomerated or large particle size rubber latex is added to the partially polymerized mixture after a substantial portion of the monomer formulation has been grafted upon the small particle rubbery polymer. Normally, this point of addition will occur after there have been polymerized at least about 35 parts of monomer formulation per 100 parts of small particle rubbery polymer and preferably after at least about 50 parts of monomer formulation per 100 parts of small particle rubbery polymer have been polymerized. The actual point for the addition of the large rubbery polymer latex will vary upon the amount of grafting thereof desired and the total amount of monomer formulation to be polymerized in the presence of the two rubbery polymers. However, it is generally desirable to add the large particle rubbery polymer after the polymerization cycle is at least 30 percent completed and preferably at about 50–70 percent completion.

Although the small particle size rubbery polymer may be as little as 0.03 micron in diameter (weight average) and may range up to 0.25 micron, the preferred compositions use rubbery polymers having a particle size of about 0.08–0.25 micron and most desirably about 0.1–0.2 micron.

Although the large particle rubbery polymer may range as high as 1.2 microns in diameter (weight average) and be as small as 0.35 micron in diameter, the preferred compositions utilize rubbery polymers having a particle size of about 0.4 to 1.0 micron in diameter, and most desirably about 0.5–0.8 micron.

Normally, the ratio of the large particle rubbery polymer to small particle rubbery polymer will be about 10–100:100 and preferably about 20–60:100. As the particle size of the larger particle decreases, the amount thereof relative to the small particle should be increased to obtain equivalent impact properties in the composition.

Exemplary of the effect of varying the time of addition of the large particle rubbery polymer to the polymerizing mixture, the size of the large particle rubbery polymer, the total rubber content of the composition and the ratio of the two rubbery polymers are the data set forth in the following table.

TABLE ONE

| Total rubber in final blend, percent | Average diameter large particle rubber, micron | Percent of total rubber provided by large particle rubber | Time of Addition of large particle rubber, hours of cycle | Izod impact, lb./in. notch | Falling dart impact, 0° F. | Hunter gloss |
|---|---|---|---|---|---|---|
| 21 | 0.4 | 20 | 2 | 3.0 | 46 | 78 |
| 21 | 0.4 | 20 | 4 | 4.4 | 52 | 68 |
| 17 | 0.4 | 20 | 2 | 2.2 | 8 | 78 |
| 17 | 0.4 | 20 | 3 | 2.0 | 8 | 77 |
| 17 | 0.4 | 20 | 4 | 3.3 | 32 | 65 |
| 17 | 0.55 | 20 | 3 | 2.1 | 24 | 81 |
| 17 | 0.55 | 20 | 4 | 3.2 | 17 | 69 |
| 17 | 0.55 | 30 | 3 | 2.6 | 8 | 74 |
| 17 | 0.55 | 30 | 4 | 5.3 | 11 | 63 |
| 13 | 0.55 | 40 | 2 | 2.0 | 17 | 82 |
| 17 | 0.55 | 40 | 3 | 3.9 | 37 | 66 |
| 21 | 0.55 | 40 | 4 | 8.6 | 52 | 38 |

In the process which generated the test data reported in the foregoing table, the total monomer formulation added was 125 parts per 100 parts of total rubber (both large and small particle) in the composition, and the monomer formulation was added continuously at a constant rate over a period of five hours. The total polymerization cycle was seven hours.

Effect of particle size on graft ratio

Generally, the particle size of the rubbery polymer has an effect upon the optimum grafting level for the large particle graft copolymer and to a lesser extent on the optimum grafting level for the small graft copolymer. As will be readily appreciated, a given weight percentage of smaller size rubber particles will provide considerably greater surface area for grafting than the equivalent weight of a larger size rubber particle. Accordingly, the density of grafting produced by a given weight of graft superstrate will vary depending upon the size of the rubber particle. An excessive graft level is to be avoided with respect to the large particle rubber since it will adversely affect its contribution to impact resistance.

Normally, the small particle rubber is relatively highly grafted with the conditions being selected so as to produce a superstrate to substrate ratio of 45–100:100 and preferably 50–70:100, depending upon the particle size. The large particle rubber is relatively lightly grafted with the polymerization conditions and the time of addition being selected to produce a superstrate to substrate ratio of about 15–40:100 and preferably 20–35:100.

The polymer blend

As will be readily appreciated, the rubber content of the polymer blend produced by the graft polymerization process of the present invention may be in excess of that desired for the final product since economics generally dictate the use of high rubber levels in the graft polymerization reaction. Accordingly, the graft polymerization blend resulting from the graft polymerization reaction will normally be blended with a vinylidene polymer of similar composition to increase the amount of matrix polymer and reduce the rubber level. This resinous polymer used for dilution of the graft copolymer may be produced by an emulsion process so that the latex thereof may be combined with the latex from the graft polymerization process and the mixed latex coagulated. Alternatively, the recovered graft copolymer may be admixed with a separately formed resinous polymer produced by emulsion, suspension or mass polymerization techniques.

Generally, the final polymer blends will contain 2–50 percent by weight of the total of the two rubber components. Increasing the total amount of rubber graft in the composition while maintaining the ratio of the large to small particle graft components constant generally increases the Izod impact strength of the composition but rapidly increases the viscosity of the blend and decreases the tensile strength at yield and fail and the tensile modulus. Accordingly, the preferred blends contain about 7–35 percent by weight of the combined graft copolymers based upon rubber and most desirably about 13–25 percent by weight thereof.

Exemplary of the efficacy of the present invention are the following specific examples wherein all parts are parts by weight unless otherwise indicated.

EXAMPLE ONE

A latex of butadiene/acrylonitrile copolymer (93:7) having a particle size (weight average) of 0.08 micron and containing 40 percent solids is admixed with water in the ratio of 380 parts water to 293 parts rubber latex. To this emulsion over a period of four hours are added a mixture of 195 parts of styrene/acrylonitrile monomer (70:30) and 1.3 parts of terpinolene and 98 parts of a 2 percent aqueous solution of potassium persulfate. During this period, the emulsion is maintained under an atmosphere of nitrogen with stirring and the temperature is held at 75° centigrade.

At the end of this period, there is added to the emulsion 95 parts of a butadiene/styrene (75:25) latex having a broad particle size distribution with an average particle size of 0.8 micron (weight average) and a solids content of about 70 percent as well as 45 parts water. Following the addition of these two materials, a mixture of 105 parts of styrene/acrylonitrile (70:30) and 0.6 part of terpinolene are added continuously over a period of one hour and 53 parts of a 2 percent aqueous solution of potassium persulfate is added for the same period. The temperature is maintained at 75° centigrade, both during the period of addition and for one hour thereafter; the unreacted monomers are then distilled from the reaction mixture. Following coagulation with magnesium sulfate the rubber crumb is washed and dried.

The graft copolymer thus prepared is blended with a styrene/acrylonitrile copolymer (67:33) prepared by suspension polymerization to provide a final rubber content of 24 percent by weight. Test specimens are made therefrom and physical tests are conducted. The Izod impact value is found to be 4.5 foot/pounds per inch of notch; the Hunter gloss is 23; and the percent shrinkage is 18.6.

EXAMPLE TWO

Repeated efforts to graft large particle latices of the above-mentioned type furnished by several manufacturers are found to prove unsatisfactory due to the formation of coagulum and in some instances complete setting up of the reaction mixture.

An emulsion is prepared from 635 parts water and 430 parts of a commercial rubber latex having an average particle size of 0.8 micron (weight average) and a broad particle size distribution with 70 percent solids. To this emulsion over a period of four hours is added a mixture of 210 parts styrene/acrylonitrile (70:30) and 1.15 parts terpinolene as well as 105 parts of a 2 percent aqueous solution of potassium persulfate. The emulsion is then held at temperature for an additional hour. It is found that this emulsion contains 85 parts of lumps or coagulum.

When the ratio of monomer formulation to rubber is increased to 1:1, the entire reaction mixture sets up during the course of polymerization even when additional rubber reserve soap is added in an effort to provide stability.

EXAMPLE THREE

A latex of butadiene/acrylonitrile copolymer (93:7) having a particle size (weight average) of 0.05 micron is agglomerated with acetic anhydride to a particle size of 0.4 micron with a final solids content of about 31 percent.

A latex of a butadiene/styrene rubber copolymer (90:10) having an average particle size of 0.12 micron is admixed with water to provide an emulsion. The amount of water is calculated to provide a final solids content at the end of polymerization of 38 percent. To this latex over a period of five hours is added 125 parts of a styrene/acrylonitrile monomer mixture (70:30) with the initial rubber latex providing 64.5 parts rubber. In addition, 1.6 parts terpinolene are added over the same period together with potassium persulfate as the initiator. At the end of 3.5 hours, a latex containing 35.5 parts of the agglomerated rubber is added and the temperature is raised to 75° centigrade. Following the completion of the addition of the monomer formulation, the emulsion is held at temperature for an additional period of two hours. The emulsion is then coagulated by freezing, washed and dried.

The graft copolymer is blended with the styrene/acrylonitrile copolymer of Example One to a rubber level of 17 percent. Test specimens are prepared therefrom and subjected to physical testing. The Izod impact value is 4.3 ft./lbs. per inch of notch; the Hunter gloss value is 62; and the falling dart impact value at 0° centigrade is 24 ft./lbs.

Thus, it can be seen that the process of the present invention provides a highly effective technique for the manufacture of improved polyblends with a desirable balance of properties from rubber substrates of two different particle sizes. A single reactor and a single process cycle are employed, and the process is readily adapted to accommodate variations in particle size and desired grafting level. The polyblends take advantage of the benefits provided by bimodality of particle size and of different grafting ratios for the two different particle sizes so that optimum properties can be obtained.

What is claimed is:

1. A process for making a polyblend comprising forming a latex of a polymerizable vinylidene monomer formulation and a graftable rubbery polymer having an average particle size of less than 0.25 micron (weight average) and a diene monomer component, said rubbery polymer being selected from the group consisting of diene rubbers, ethylene/propylene rubbers, and acrylate rubbers, said vinylidene monomer formulation being comprised at least principally of monomers selected from the group consisting of monovinylidene aromatic hydrocarbons, ethylenically unsaturated nitriles, conjugated 1,3-dienes, acrylic acid and its esters and amides, alkacrylic acids and their esters and amides, vinyl esters, dialkyl maleates, dialkyl fumarates, and mixtures thereof; subjecting said latex to polymerization conditions to produce grafting onto said graftable rubbery polymer of at least a portion of the vinylidene polymer being formed; adding to said latex an agglomerated graftable rubbery polymer subsequent to commencement of polymerization of said vinylidene monomer formulation; said agglomerated rubbery polymer being added in an amount equal to 10–100 percent by weight of said first mentioned rubbery polymer, said agglomerated rubbery polymer having an average particle size of 0.35–1.2 microns (weight average) and being selected from the group of rubbery polymers with a diene monomer component and consisting of diene rubbers, ethylene/propylene rubbers and acrylate rubbers, said addition occurring after polymerization of at least about 35 parts of monomer formulation per 100 parts of said first mentioned rubbery polymer; and thereafter continuing polymerization of the vinylidene monomer formulation to produce grafting upon said agglomerated rubbery polymer of at least a portion of the vinylidene polymer being formed; and recovering a polyblend containing both sizes of rubbery polymer particles grafted with the vinylidene polymer.

2. The process in accordance with claim 1 wherein said polymerizable vinylidene monomer formulation is comprised at least principally of a monovinylidene aromatic hydrocarbon and an ethylenically unsaturated nitrile.

3. The process in accordance with claim 1 wherein said vinylidene monomer formulation is added over at least half the polymerization cycle, 25–80 percent thereof being added prior to the addition of the large particle rubbery polymer.

4. The process in accordance with claim 3 wherein said large particle rubbery polymer is added after one-half the total monomer formulation has been added.

5. The process in accordance with claim 1 wherein said agglomerated rubbery polymer has a particle size of 0.4–1.0 micron and wherein said first mentioned rubbery polymer has a particle size of 0.05–0.20 micron.

6. The process in accordance with claim 1 wherein said agglomerated rubbery polymer is added in an amount equal to 20–60 percent by weight of the small particle rubbery polymer.

7. The method of claim 2 wherein said monovinylidene aromatic hydrocarbon is styrene and said unsaturated nitrile is acrylonitrile.

8. The method of claim 1 wherein said rubbery polymers contain at least about 75 percent by weight of conjugated 1,3-diene.

9. The method of claim 1 wherein said rubbery polymers combined comprise about 2–50 percent by weight of said polyblend.

10. The method of claim 1 wherein the small particle graft copolymer has a superstrate to substrate ratio of about 45–100:100 and wherein said agglomerated graft copolymer has a superstrate to substrate ratio of about 15–40:100.

11. A process for making a polyblend comprising forming a latex of a polymerizable vinylidene monomer formulation and a graftable rubbery polymer having an average particle size of less than 0.25 micron (weight average) and selected from the group consisting of homopolymers of conjugated 1,3-dienes and interpolymers of conjugated 1,3-dienes containing at least 50 percent by weight thereof, said vinylidene monomer formulation being comprised at least principally of a monovinylidene aromatic hydrocarbon and an ethylenically unsaturated nitrile; subjecting said latex to polymerization conditions to produce grafting onto said graftable rubbery polymer of at least a portion of the vinylidene polymer being formed; adding to said latex an agglomerated graftable rubbery polymer subsequent to commencement of polymerization of said vinylidene monomer formulation; said agglomerated rubbery polymer being added in an amount equal to 10–100 percent by weight of said first mentioned rubbery polymer, said agglomerated rubbery polymer having an average particle size of 0.35–1.2 microns (weight average) and being selected from the group consisting of homopolymers of conjugated 1,3-dienes and interpolymers of conjugated 1,3-dienes containing at least 50 percent by weight thereof, said addition occurring after polymerization of at least about 35 parts of monomer formulation per 100 parts of said first mentioned rubbery polymer; and thereafter continuing polymerization of the vinylidene monomer formulation to produce grafting upon said agglomerated rubbery polymer of at least a portion of the vinylidene polymer being formed; and recovering a polyblend containing both sizes of rubbery polymer particles grafted with the vinylidene polymer.

12. The process in accordance with claim 11 wherein said vinylidene monomer formulation is added over at least half the polymerization cycle, 25–80 percent thereof being added prior to the addition of the large particle rubbery polymer.

13. The process in accordance with claim 12 wherein said large particle rubbery polymer is added after one-half the total monomer formulation has been added.

References Cited
UNITED STATES PATENTS

| | | | |
|---|---|---|---|
| 3,509,237 | 4/1970 | Aubrey | 260—876 |
| 3,558,541 | 1/1971 | Dalton | 260—880 X |

MURRAY TILLMAN, Primary Examiner

H. W. ROBERTS, Assistant Examiner

U.S. Cl. X.R.

260—23.7 A, 29.7 UP, 878 R, 879, 880 R